US012794666B2

(12) United States Patent
Seshadri

(10) Patent No.: US 12,794,666 B2
(45) Date of Patent: Nov. 10, 2026

(54) SYSTEM AND METHOD FOR HOMOMORPHIC ENCRYPTION IN HEALTHCARE NETWORK

(71) Applicant: Healthy Engage LLC, Frisco, TX (US)

(72) Inventor: Ravi Seshadri, Frisco, TX (US)

(73) Assignee: Healthy Engage LLC, Frisco, TX (US)

( * ) Notice: Subject to any disclaimer, the term of this patent is extended or adjusted under 35 U.S.C. 154(b) by 78 days.

(21) Appl. No.: 18/905,218

(22) Filed: Oct. 3, 2024

(65) Prior Publication Data

US 2026/0100816 A1 Apr. 9, 2026

(51) Int. Cl.
*G06F 21/00* (2013.01)
*G06F 21/60* (2013.01)
*H04L 9/00* (2022.01)

(52) U.S. Cl.
CPC ............ *H04L 9/008* (2013.01); *G06F 21/602* (2013.01)

(58) Field of Classification Search
CPC ............................... H04L 9/008; G06F 21/602
See application file for complete search history.

(56) References Cited

U.S. PATENT DOCUMENTS 11,632,358 B2 * 4/2023 Soon-Shiong ...... H04L 63/0428 713/155
12,462,246 B1 * 11/2025 Witchey ................ H04L 9/3213
2007/0140479 A1 * 6/2007 Wang ........................ H04L 9/30 380/30
2016/0105402 A1 * 4/2016 Soon-Shiong ...... H04L 63/0428 713/164
2017/0244553 A1 * 8/2017 Savry ...................... G06F 21/72
2022/0116198 A1 * 4/2022 Na ........................ H04L 9/3093
2024/0086382 A1 * 3/2024 Soon-Shiong .......... G06F 16/22
2024/0264996 A1 * 8/2024 Soon-Shiong ...... G06F 16/2255
2025/0365007 A1 * 11/2025 Galvin ................... G06N 20/00
2026/0025337 A1 * 1/2026 Leem .................... H04L 47/193

OTHER PUBLICATIONS

Sethi et al, Integration of role based access control with homomorphic cryptosystem for secure and controlled access of data in cloud. <https://dl.acm.org/doi/pdf/10.1145/3136825.3136902> Oct. 13, 2017 (Year: 2017).*

* cited by examiner

*Primary Examiner* — Kendall Dolly

(57) ABSTRACT

An electronic device includes at least one processor and memory. The memory stores instructions that, when executed by the at least one processor, cause the electronic device to execute a homomorphic encryption engine to encrypt preprocessed data and store the encrypted data in a storage location, receive a query from another electronic device associated with the encrypted data, generate, using the homomorphic encryption engine, a homomorphic workspace, initiate, using the homomorphic encryption engine, a secure homomorphic work session using the homomorphic workspace, and perform one or more data transactions with the other electronic device using the homomorphic workspace.

20 Claims, 4 Drawing Sheets

SYSTEM AND METHOD FOR HOMOMORPHIC ENCRYPTION IN HEALTHCARE NETWORK

TECHNICAL FIELD

This disclosure relates generally to homomorphic encryption schemes. More specifically, this disclosure relates to a system and method for homomorphic encryption in a healthcare network.

BACKGROUND

The healthcare industry is rapidly evolving and so are the options available to support it. However, current technological systems for monitoring patients and aspects of their healthcare are antiquated and rely on incomplete data and poor decision-making solutions.

SUMMARY

This disclosure relates to a system and method for homomorphic encryption in a healthcare network.

In one example, an electronic device includes at least one processor and memory. The memory stores instructions that, when executed by the at least one processor, cause the electronic device to execute a homomorphic encryption engine to encrypt preprocessed data and store the encrypted data in a storage location. The memory also stores instructions that, when executed by the at least one processor, cause the electronic device to receive a query from another electronic device associated with the encrypted data. The memory also stores instructions that, when executed by the at least one processor, cause the electronic device to generate, using the homomorphic encryption engine, a homomorphic workspace. The memory also stores instructions that, when executed by the at least one processor, cause the electronic device to initiate, using the homomorphic encryption engine, a secure homomorphic work session using the homomorphic workspace. The memory also stores instructions that, when executed by the at least one processor, cause the electronic device to perform one or more data transactions with the other electronic device using the homomorphic workspace.

In one or more of the above examples, to generate the homomorphic workspace, the instructions that, when executed by the at least one processor, further cause the electronic device to compile a results set satisfying the query and load the results set into the homomorphic workspace.

In one or more of the above examples, the homomorphic encryption engine includes an application programming interface (API) to facilitate encrypted data analysis operations within the homomorphic workspace.

In one or more of the above examples, the API is configured to be compatible with the results set.

In one or more of the above examples, to create the preprocessed data, the instructions that, when executed by the at least one processor, further cause the electronic device to extract data from at least one internet-connected data source and preprocess the extracted data, including performance of one or more of an anonymization of the extracted data, cleansing of the extracted data, feature extraction on the extracted data, standardization of the extracted data, or compression of the extracted data.

In one or more of the above examples, the instructions that, when executed by the at least one processor, further cause the electronic device to store the extracted data in a raw database.

In one or more of the above examples, the instructions that, when executed by the at least one processor, further cause the electronic device to determine that the performance of the one or more data transactions is complete and terminate, based on the determination, the secure homomorphic work session and the homomorphic workspace.

In one or more of the above examples, the instructions that, when executed by the at least one processor, further cause the electronic device to perform access control, using the homomorphic encryption engine, including performance of enforcement of role-based access control with respect to the other electronic device to grant or deny access to the homomorphic workspace by the other electronic device.

In one or more of the above examples, the instructions that, when executed by the at least one processor, further cause the electronic device to monitor and audit, using the homomorphic encryption engine, user access and data usage and generate one or more reports based on the monitoring and auditing.

In another example, a method includes executing a homomorphic encryption engine to encrypt preprocessed data and store the encrypted data in a storage location. The method also includes receiving a query from an electronic device associated with the encrypted data. The method also includes generating, using the homomorphic encryption engine, a homomorphic workspace. The method also includes initiating, using the homomorphic encryption engine, a secure homomorphic work session using the homomorphic workspace. The method also includes performing one or more data transactions with the electronic device using the homomorphic workspace.

In one or more of the above examples, generating the homomorphic workspace includes compiling a results set satisfying the query and loading the results set into the homomorphic workspace.

In one or more of the above examples, the homomorphic encryption engine includes an application programming interface (API) to facilitate encrypted data analysis operations within the homomorphic workspace.

In one or more of the above examples, the API is compatible with the results set.

In one or more of the above examples, creating the preprocessed data includes extracting data from at least one internet-connected data source and preprocessing the extracted data, including performing one or more of an anonymization of the extracted data, cleansing of the extracted data, feature extraction on the extracted data, standardization of the extracted data, or compression of the extracted data.

In one or more of the above examples, the method further includes storing the extracted data in a raw database.

In one or more of the above examples, the method further includes determining that the performance of the one or more data transactions is complete and terminating, based on the determination, the secure homomorphic work session and the homomorphic workspace.

In one or more of the above examples, the method further includes performing access control using the homomorphic encryption engine, including performing enforcement of role-based access control with respect to the electronic device to grant or deny access to the homomorphic workspace by the electronic device.

In one or more of the above examples, the method further includes monitoring and auditing, using the homomorphic encryption engine, user access and data usage and generating one or more reports based on the monitoring and auditing.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch).

Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such as APPLETV or GOOGLE TV), a smart speaker or speaker with an integrated digital assistant (such as APPLE HOMEPOD or AMAZON ECHO), a gaming console (such as an XBOX, PLAYSTATION, or NINTENDO consoles), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 4, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, the healthcare industry is rapidly evolving and so are the options available to support it. However, current technological systems for monitoring patients and aspects of their healthcare are antiquated and rely on incomplete data and poor decision-making solutions.

In various embodiments, this disclosure provides for homomorphic encryption in a healthcare network. In various embodiments, the system includes the ability to generate a homomorphic workspace to facilitate a homomorphic work session between electronic devices. During the homomorphic work session using the homomorphic workspace, data can be exchanged and worked on without exposing the actual data.

Figure 1:
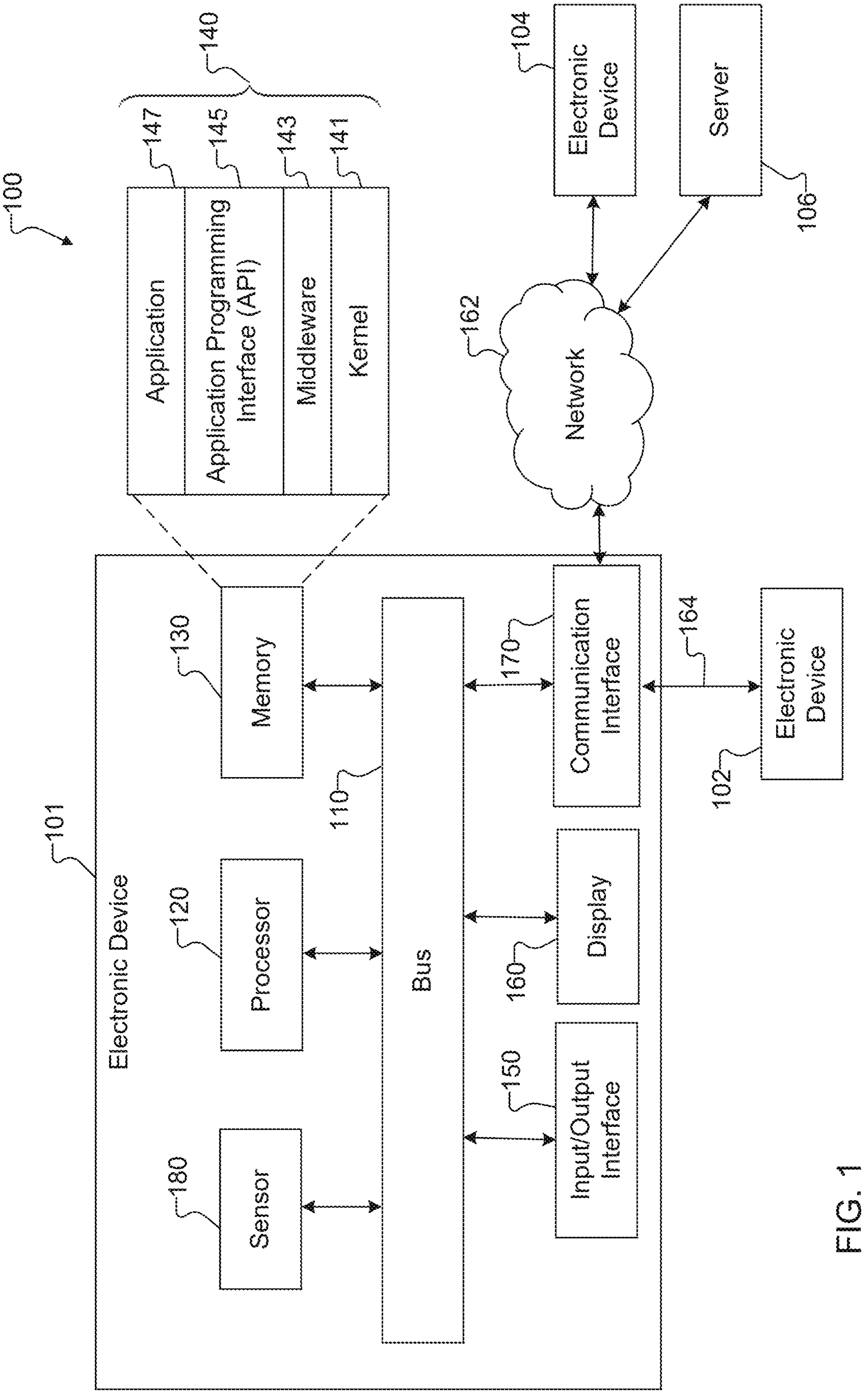
FIG. 1 illustrates an example network configuration including an electronic device in accordance with this disclosure.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith.

The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101.

Although FIG. 1 illustrates one example of a network configuration 100 including an electronic device 101, various changes may be made to FIG. 1. For example, the network configuration 100 could include any suitable number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
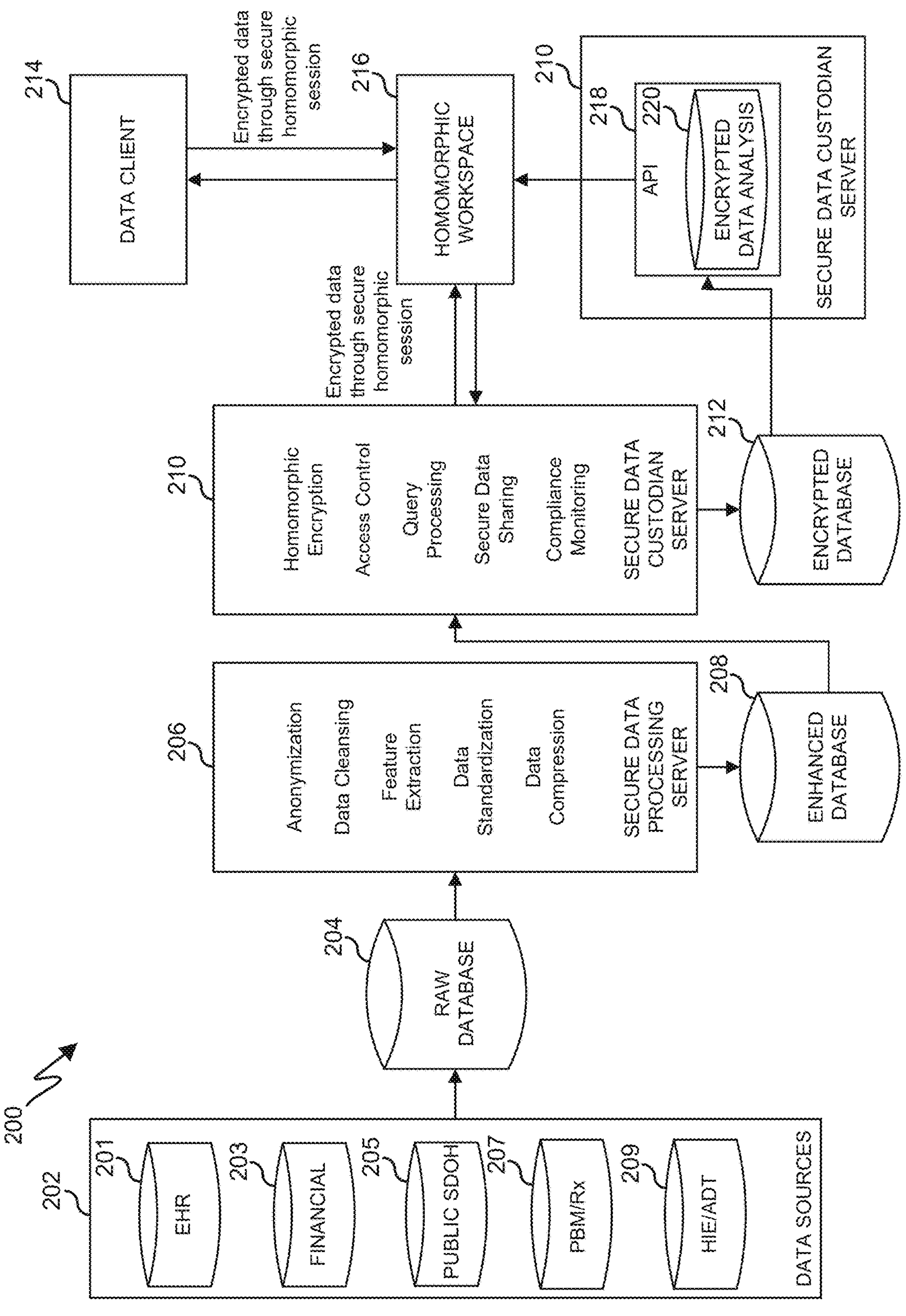
FIG. 2 illustrates an example homomorphic encryption system in accordance with this disclosure.

FIG. 2 illustrates an example homomorphic encryption system 200 in accordance with this disclosure. For ease of explanation, the system 200 may be described as involving the use of the electronic device 101 in the network configuration 100 of FIG. 1 and/or one or more servers 106. However, the system 200 may be used with any other suitable electronic device(s) and in any other suitable system(s), such as when the system 200 is implemented on or supported by the server 106.

As shown in FIG. 2, in various embodiments, the system 200 includes a secure data custodian server 210 that performs homomorphic encryption in a network, such as a healthcare financial network/environment, ensuring the security and privacy of sharing and analyzing sensitive healthcare data. The system 200 enables computations on encrypted data without the need for decryption. This approach ensures that sensitive data remains protected while still enabling the necessary computations and analysis required for effective decision-making, such as decision-making in the healthcare industry. Since the technique enables computations on encrypted data without the need for decryption, sensitive information can be protected while still enabling effective decision-making in the healthcare industry. The system 200 can include or access a plurality of data sources 202. The data sources 202 can include one or more electronic health record (EHR) data sources 201, financial data sources 203, public social determinants of health (SDOH) data sources 205, pharmacy benefits management (PBM)/medical prescription (Rx) data sources 207, health information exchange (HIE) or admission-discharge-transfer (ADT) data sources 209, or any other healthcare data sources or databases that can be used to generate and store data in different formats. In various embodiments, the data from the plurality of data sources 202 can be stored in a raw or unaltered format in a raw database 204.

The system 200 further includes a secure data processing server 206 that, using the various data sources 202, collects, transforms and/or filters the data, and/or performs data anonymization, data cleansing, feature extraction, data standardization, data compression data enrichment, and/or data transformation on the data. For example, the secure data processing server 206 is responsible for standardizing and transforming data from different sources into a compatible format for homomorphic encryption. The Secure Data Preprocessing Server is responsible for processing raw healthcare data before it is encrypted and transmitted through the network.

Specifically, in various embodiments, the secure data processing server 206 can perform anonymization, including removing personally identifiable information (PII) from the raw data, ensuring the privacy of patients and healthcare providers. In various embodiments, the secure data processing server 206 can also perform data cleansing, including identifying and correcting errors, inconsistencies, and inaccuracies in the raw data, improving the overall quality of the data. In various embodiments, the secure data processing server 206 can also perform feature extraction, including identifying relevant features from the raw data that are crucial for subsequent analysis and decision-making processes. In various embodiments, the secure data processing server 206 can also perform data standardization, including converting raw data into a consistent format, making it easier for the data custodian server 210 to process and analyze the information. In various embodiments, the secure data processing server 206 can also perform data compression, including reducing the size of the data through advanced compression algorithms, minimizing the time and resources required for transmission and storage.

In various embodiments, outputs from the secure data processing server 206 are stored in an enhanced database 208, and data from the enhanced database 208 can be accessed by other devices or systems, such as the secure data custodian server 210. The secure data custodian server 210 receives and stores the standardized data. It is responsible for encrypting the data using a homomorphic encryption scheme and managing secure homomorphic work sessions with data consumer devices. This encryption allows for secure computations on the data without exposing the underlying information.

As part of the secure data custodian server 210's responsibilities for securely storing, managing, and analyzing encrypted healthcare data, the secure data custodian server 210 can perform a variety of functions. The secure data custodian server 210 can perform homomorphic encryption utilizing advanced cryptographic techniques that enable computations on encrypted data without the need for decryption, ensuring the privacy and security of sensitive healthcare data. The process of performing homomorphic encryption involves applying homomorphic encryption to the data within or accessed by the data custodian server, ensuring that computations can be performed on encrypted data without exposing the original information. This data can then be stored in an encrypted database 212.

In various embodiments, the secure data custodian server 210 can also perform access control, including implementing role-based access control mechanisms to ensure that only authorized users can access and perform computations on the encrypted data. In various embodiments, the secure data custodian server 210 can also perform query processing, including supporting secure query processing and analytics on encrypted data, which can enable healthcare stakeholders to make informed decisions without compromising privacy. In various embodiments, the secure data custodian server 210 can also perform secure data sharing, including facilitating secure data sharing among authorized parties while maintaining data privacy, allowing collaboration between healthcare providers, insurance companies, and researchers. In various embodiments, the secure data custodian server 210 can also perform compliance monitoring, including monitoring and auditing the access and usage of encrypted data to ensure compliance with relevant healthcare regulations and data protection standards.

The system 200 also includes a data client device 214. In various embodiments, the data client device 214 can represent various authorized devices/users, such as healthcare providers, insurance companies and associated devices, or researchers and associated devices, that access and analyze the encrypted data. When a data client device 214 submits a query regarding a specific portion of the encrypted data, the data custodian server 210 initiates a secure homomorphic work session between the server 210 and the data client device 214. This secure homomorphic work session is an encrypted communication channel that connects the data custodian server 210 and the data client device 214, allowing data consumers to perform computations on the encrypted data securely. To facilitate the secure work session, a homomorphic workspace 216 is generated, which is associated with the homomorphic work session.

This homomorphic workspace 216 is created within the data custodian server 210 for each homomorphic work session, allowing the data consumer to perform computations on the encrypted data without exposing the original information. The data custodian server compiles a results set that satisfies the query and loads the results set into the homomorphic workspace 216. This process ensures that the data remains encrypted and secure throughout the entire workflow. The homomorphic workspace 216 is a secure computational environment where encrypted data can be processed and analyzed without the need for decryption. This environment leverages homomorphic encryption, a cryptographic technique that allows operations to be performed on ciphertexts (encrypted data) without revealing any information about the underlying plaintext (original data). As a result, sensitive data remains protected and secure during computation, and only the authorized parties can access the final results after decryption.

In the context of a healthcare financial network, a homomorphic workspace provides a secure platform for various stakeholders, including healthcare providers, insurance companies, and researchers, to perform operations and analysis on encrypted healthcare data without compromising privacy. In various embodiments, the homomorphic workspace 216 uses an encrypted data storage such as the encrypted database 212 to securely store encrypted data, ensuring that sensitive information is not exposed to unauthorized parties. In various embodiments, the homomorphic workspace 216 can perform secure computation in which the workspace 216 enables complex computations, such as data analysis and machine learning, to be performed directly on encrypted data without decryption, ensuring data privacy and security. In various embodiments, the homomorphic workspace 216 can perform access control in which the workspace 216 incorporates role-based access control mechanisms to manage user access and permissions, ensuring that only authorized users can perform computations on the encrypted data. In various embodiments, the homomorphic workspace 216 can perform secure data sharing in which the workspace 216 supports the secure exchange of encrypted data among authorized parties, allowing for collaborative analysis and decision-making without compromising data privacy. In various embodiments, the homomorphic workspace 216 can perform compliance and auditing in which the workspace monitors and audits user access and data usage, ensuring compliance with relevant regulations and data protection standards.

The system 200 also includes, such as implemented or managed by the secure data custodian server 210, an API 218. The API 218 can be customizable and can facilitate encrypted data analysis operations 220 within the homomorphic workspace 216, enabling data consumers to perform necessary computations while maintaining data privacy and security. To enable seamless integration with various applications, the API 218 can be built to be compatible with the results set. The API 218 can also facilitate encrypted analysis on the results set within the homomorphic workspace 216, allowing data consumers to perform necessary computations while preserving the privacy and security of the sensitive healthcare data.

The homomorphic encryption system 200 addresses several critical challenges in the industry, including data privacy, regulatory compliance, and real-time data access. In addition to the features outlined above, in various embodiments, the system 200 can also include data format standardization processes in which, to accommodate the diverse formats of data from various sources, the system 200 incorporates a data preprocessing module, such as part of the secure data processing server 206. This module standardizes the input data, ensuring compatibility with the homomorphic encryption scheme and enhancing the system's interoperability. In various embodiments, the system 200 can also include access control and authentication processes, such as performed using the secure data custodian server 210, in which the system 200 integrates robust access control mechanisms and user authentication protocols to ensure that only authorized data consumers can initiate homomorphic work sessions. This feature further strengthens data security and helps organizations comply with regulatory requirements, such as HIPAA and GDPR.

In various embodiments, the system 200 can also include scalability and performance optimization processes in which the homomorphic encryption system 200 is designed to handle large-scale data sets and high-volume queries efficiently. Advanced optimization techniques can be employed to minimize the computational overhead associated with homomorphic encryption, ensuring timely access to results without compromising data privacy. In various embodiments, the system 200 can also include auditing and monitoring processes in which the system 200 includes comprehensive auditing and monitoring capabilities, allowing healthcare organizations to track and analyze data access patterns, identify potential security risks, and maintain a detailed audit trail for compliance purposes. In various embodiments, the system 200 can provide for integration with existing healthcare systems. For example, the homomorphic encryption is designed to be integrated with existing healthcare financial systems and platforms. This seamless integration enables healthcare organizations to adopt the solution with minimal disruption to their existing workflows and processes. Also, as noted above, the API 218 can be customizable, such that the built-in API 218 can be customized to meet the specific needs of various healthcare applications and use cases, ensuring flexibility and adaptability in diverse healthcare network environments.

Although FIG. 2 illustrates one example of a homomorphic encryption system 200, various changes may be made to FIG. 2. For example, various components and functions in FIG. 2 may be combined, further subdivided, replicated, or rearranged according to particular needs. Also, one or more additional components and functions may be included if needed or desired. In general, computing architectures come in a variety of configurations, and this disclosure is not limited to any particular architecture. For example, although FIG. 2 shows different servers and databases, these different components could be combined into a single entity. In some embodiments, the servers 206 and 210 can be executed using the server 106.

Figure 3:
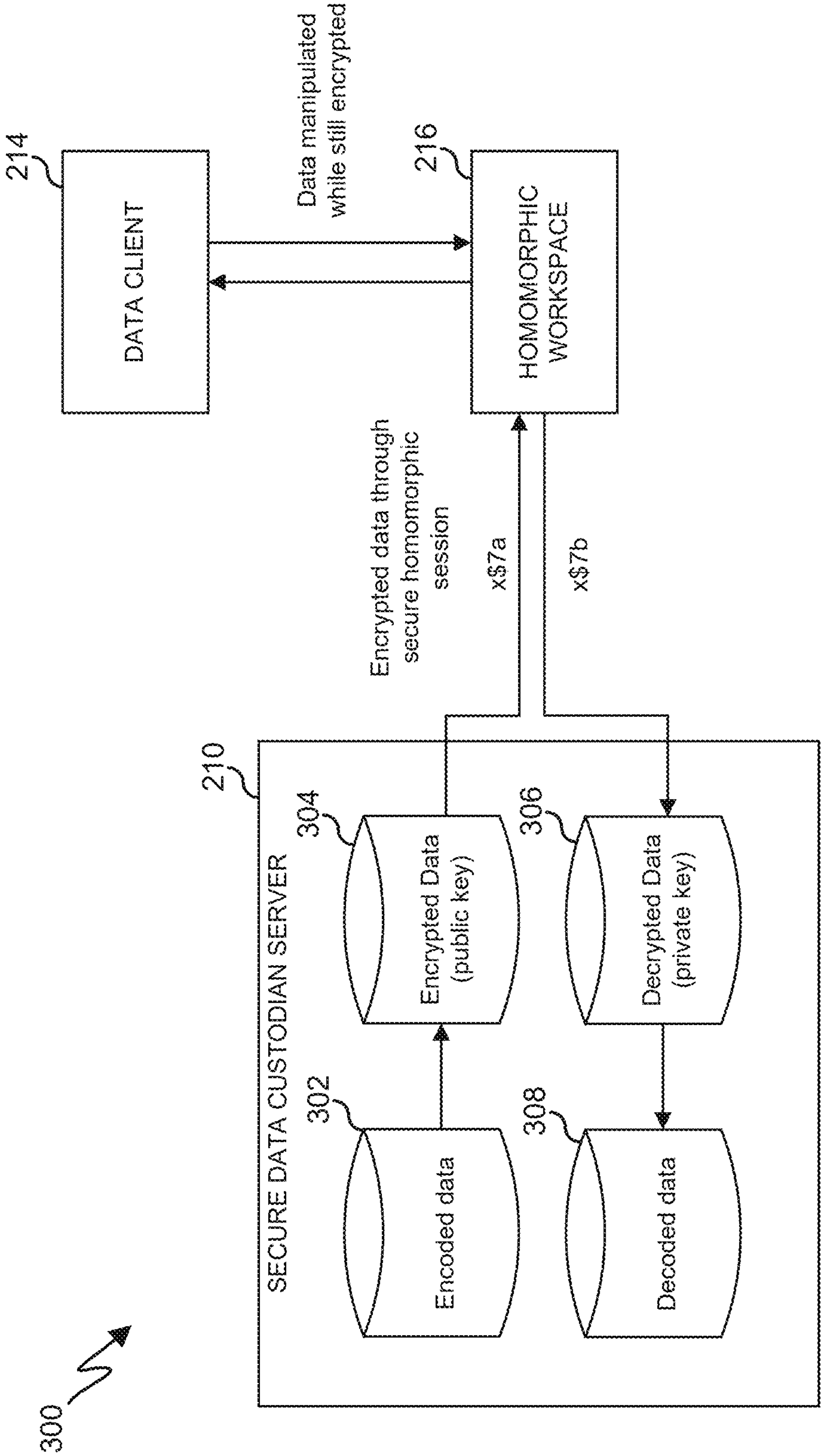
FIG. 3 illustrates an example homomorphic encryption process in accordance with this disclosure.

FIG. 3 illustrates an example homomorphic encryption process 300 in accordance with this disclosure. For ease of explanation, the process 300 shown in FIG. 3 may be described as being performed using the electronic device 101 in the network configuration 100 of FIG. 1 and/or within the system 200. However, the process 300 could be performed using any other suitable device(s), such as the server 106, and in any other suitable system(s).

As shown in FIG. 3, the process includes utilizing a device in a trusted environment such as the secure data custodian server 210. The trusted device can retrieve data 302 that can be encoded data created using raw data. For example, data processed by the secure data processing server 206 can encode raw data from the plurality of data sources 202, such as encoding the data into plaintext data. The encoded data 302 is encrypted, such as by using a public key, to create ciphertexts from the encoded data 302.

During a secure homomorphic work session, the encrypted data can be provided by the trusted environment, e.g., the secure data custodian server 210, for manipulation or other changes to be made by the data client device 214 via the homomorphic workspace 216. For example, using the public key, the data client device 214 can manipulate the data while keeping it encrypted so that the data is never unencrypted while it is being accessed by an entity outside the trusted environment.

The now altered encrypted data is received over the secure channel of the homomorphic work session and can be stored within the trusted environment. In some embodiments, the device in the trusted environment, such as the secure data custodian server 210, can decrypt the received altered encrypted data using a private key to obtain decrypted data 306. In some embodiments, the device in the trusted environment, such as the secure data custodian server 210, can decode the decrypted data, such as decoding the data stored in plaintext into numbers, and store the decoded data 308 at a storage location.

Although FIG. 3 illustrates one example of a homomorphic encryption process 300, various changes may be made to FIG. 3. For example, various components and functions in FIG. 3 may be combined, further subdivided, replicated, or rearranged according to particular needs. Also, one or more additional components and functions may be included if needed or desired.

Figure 4:
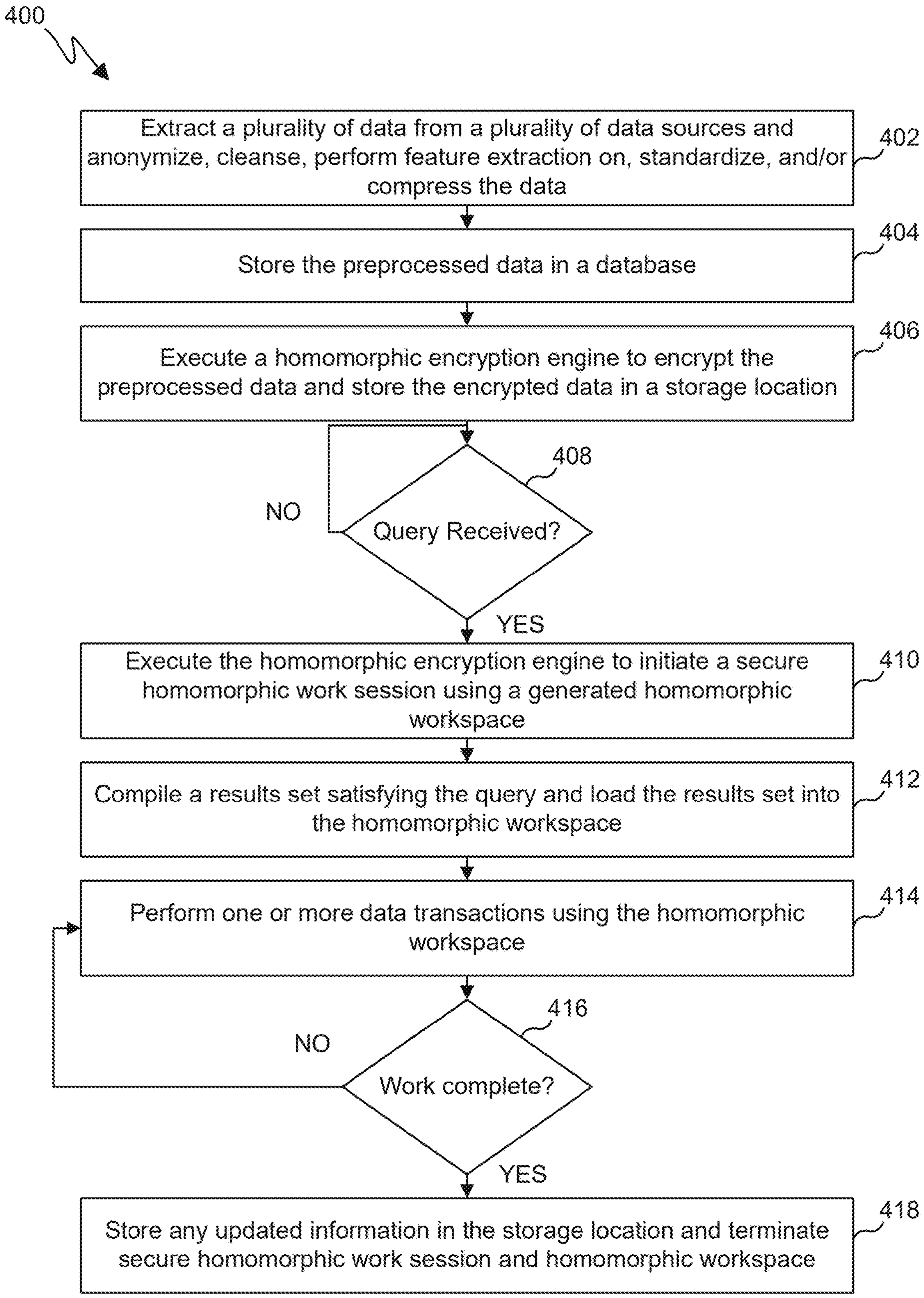
FIG. 4 illustrates an example method for performing homomorphic encryption in accordance with this disclosure.

FIG. 4 illustrates an example method 400 for performing homomorphic encryption in accordance with this disclosure. For ease of explanation, the method 400 shown in FIG. 4 may be described as being performed using the electronic device 101 in the network configuration 100 of FIG. 1 and/or within the system 200. However, the method 400 could be performed using any other suitable device(s), such as the server 106, and in any other suitable system(s).

At step 402, a plurality of data from a plurality of data sources is extracted and the plurality of data is anonymized, cleansed, has features extracted, is standardized, is compressed, and/or other data preprocessing functions are performed. This can include, for example, use of the secure data processing server 206 of FIG. 2 or another electronic device. For example, the secure data processing server 206 can be responsible for standardizing and transforming data from different sources into a compatible format for homomorphic encryption and can be responsible for processing raw healthcare data before it is encrypted and transmitted through the network. In some embodiments, before the plurality of data is preprocessed, the plurality of data can be stored in a raw or unaltered format at a storage location, such as the raw database 204 of FIG. 2. The data sources can include various data sources, such as the one or more EHR data sources, financial data sources, SDOH data sources, PBM/Rx data sources, HIE and/or ADT data sources, or any other data sources or databases that can be used to generate and store data in different formats.

For instance, in various embodiments, step 402 can involve performance of anonymization, including removing PII from the raw data, ensuring the privacy of patients and healthcare providers, data cleansing, including identifying and correcting errors, inconsistencies, and inaccuracies in the raw data, improving the overall quality of the data, feature extraction, including identifying relevant features from the raw data that are crucial for subsequent analysis and decision-making processes, data standardization, including converting raw data into a consistent format, making it easier for the data custodian server 210 to process and analyze the information, and data compression, including reducing the size of the data through advanced compression algorithms, minimizing the time and resources required for transmission and storage.

At step 404, the preprocessed data is stored in a database, such as the enhanced database 208 of FIG. 2. At step 406, a homomorphic encryption engine is executed to encrypt the preprocessed data and store the encrypted data in a storage location. This can involve the use of the secure data custodian server 210 of FIG. 2. In some embodiments, the storage location can be the encrypted database 212 of FIG. 2. In various embodiments, the homomorphic encryption engine performs homomorphic encryption in a network, such as a healthcare financial network/environment, ensuring the security and privacy of sharing and analyzing sensitive healthcare data, which enables computations on encrypted data without the need for decryption. This approach ensures that sensitive data remains protected while still enabling the necessary computations and analysis required for effective decision-making, such as decision-making in the healthcare industry. Since the technique enables computations on encrypted data without the need for decryption, sensitive information can be protected while still enabling effective decision-making in the healthcare industry. The homomorphic encryption engine is also responsible for encrypting the data using a homomorphic encryption scheme and managing secure homomorphic work sessions with data consumer devices. This encryption allows for secure computations on the data without exposing the underlying information.

At step 408, it is determined whether a query is received. For example, a client device, such as the data client device 214 of FIG. 2, can submit a query regarding a specific portion of the encrypted data. If a query is received, at step 410, the homomorphic encryption engine initiates a secure homomorphic work session between the homomorphic encryption engine (or a device executing the homomorphic encryption engine such as the server 210) and the client device, using a generated homomorphic workspace, such as the homomorphic workspace 216 of FIG. 2. In various embodiments, this secure homomorphic work session is an encrypted communication channel that connects the homomorphic encryption engine (or a device executing the homomorphic encryption engine) and the client device, allowing data consumers to perform computations on the encrypted data securely.

This homomorphic workspace can be created by the homomorphic encryption engine for each homomorphic work session, allowing the data consumer to perform computations on the encrypted data without exposing the original information. At step 412, the homomorphic encryption engine compiles a results set that satisfies the query and loads the results set into the homomorphic workspace. This process ensures that the data remains encrypted and secure throughout the entire workflow. The homomorphic workspace is a secure computational environment where encrypted data can be processed and analyzed without the need for decryption. As a result, sensitive data remains protected and secure during computation, and only the authorized parties can access the final results after decryption.

At step 414, one or more data transactions are performed using the homomorphic workspace. In the context of a healthcare financial network, the homomorphic workspace provides a secure platform for various stakeholders, including healthcare providers, insurance companies, and researchers, to perform operations and analysis on encrypted healthcare data without compromising privacy. In various embodiments, the homomorphic workspace uses an encrypted data storage, such as the encrypted database 212, to securely store encrypted data, ensuring that sensitive information is not exposed to unauthorized parties. In various embodiments, the homomorphic workspace can perform secure computation in which the workspace enables complex computations, such as data analysis and machine learning, to be performed directly on encrypted data without decryption, ensuring data privacy and security. In various embodiments, the homomorphic workspace can perform access control in which the workspace incorporates role-based access control mechanisms to manage user access and permissions, ensuring that only authorized users can perform computations on the encrypted data. In various embodiments, the homomorphic workspace can perform secure data sharing in which the workspace supports the secure exchange of encrypted data among authorized parties, allowing for collaborative analysis and decision-making without compromising data privacy. In various embodiments, the homomorphic workspace can perform compliance and auditing in which the workspace monitors and audits user access and data usage, ensuring compliance with relevant regulations and data protection standards.

In various embodiments, the method 400 can include using a customizable API, such as the API 218 of FIG. 2, to facilitate encrypted data analysis operations within the homomorphic workspace, enabling data consumers to perform necessary computations while maintaining data privacy and security. To enable seamless integration with various applications, the API can be built to be compatible with the results set. The API can also facilitate encrypted analysis on the results set within the homomorphic workspace, allowing data consumers to perform necessary computations while preserving the privacy and security of the sensitive healthcare data.

At step 416, it is determined whether work using the homomorphic work session and homomorphic workspace is complete. If so, at step 418, the homomorphic encryption engine stores any updated information in the storage location and terminates the secure homomorphic work session and the homomorphic workspace.

Although FIG. 4 illustrates one example of a method 400 for performing homomorphic encryption, various changes may be made to FIG. 4. For example, while shown as a series of steps, various steps in FIG. 4 could overlap, occur in parallel, occur in a different order, or occur any number of times (including zero times).

Although this disclosure has been described with example embodiments, various changes and modifications may be suggested to one skilled in the art. It is intended that this disclosure encompass such changes and modifications as fall within the scope of the appended claims.

What is claimed is:

1. An electronic device comprising:

at least one processor; and memory, wherein the memory stores instructions that, when executed by the at least one processor, cause the electronic device to:

extract data from at least one internet-connected data source;

store the extracted data in a raw database;

preprocess the extracted data, including performance of anonymization of the extracted data, cleansing of the extracted data, and standardization of the extracted data;

store the preprocessed data in another database for storing the preprocessed data;

execute a homomorphic encryption engine to encrypt the preprocessed data and store the encrypted data in a storage location;

receive a query from another electronic device associated with the encrypted data;

generate, using the homomorphic encryption engine, a homomorphic workspace;

initiate, using the homomorphic encryption engine, a secure homomorphic work session using the homomorphic workspace; and perform one or more data transactions with the other electronic device using the homomorphic workspace.

2. The electronic device of claim 1, wherein, to generate the homomorphic workspace, the instructions that, when executed by the at least one processor, further cause the electronic device to:

compile a results set satisfying the query; and load the results set into the homomorphic workspace.

3. The electronic device of claim 2, wherein the homomorphic encryption engine includes an application programming interface (API) to facilitate encrypted data analysis operations within the homomorphic workspace.

4. The electronic device of claim 3, wherein the API is configured to be compatible with the results set.

5. The electronic device of claim 1, wherein preprocessing the extracted data further includes performance of feature extraction on the extracted data.

6. The electronic device of claim 5, wherein preprocessing the extracted data further includes performance of compression of the extracted data.

7. The electronic device of claim 1, wherein the instructions that, when executed by the at least one processor, further cause the electronic device to:

determine that the performance of the one or more data transactions is complete; and terminate, based on the determination, the secure homomorphic work session and the homomorphic workspace.

8. The electronic device of claim 1, wherein the instructions that, when executed by the at least one processor, further cause the electronic device to:

perform access control using the homomorphic encryption engine, including performance of enforcement of role-based access control with respect to the other electronic device to grant or deny access to the homomorphic workspace by the other electronic device.

9. The electronic device of claim 8, wherein the instructions that, when executed by the at least one processor, further cause the electronic device to:

monitor and audit, using the homomorphic encryption engine, user access and data usage; and generate one or more reports based on the monitoring and auditing.

10. A method comprising:

extract data from at least one internet-connected data source;

store the extracted data in a raw database;

preprocess the extracted data, including performance of anonymization of the extracted data, cleansing of the extracted data, and standardization of the extracted data;

store the preprocessed data in another database for storing the preprocessed data;

executing a homomorphic encryption engine to encrypt preprocessed data and store the encrypted data in a storage location;

receiving a query from an electronic device associated with the encrypted data;

generating, using the homomorphic encryption engine, a homomorphic workspace;

initiating, using the homomorphic encryption engine, a secure homomorphic work session using the homomorphic workspace; and performing one or more data transactions with the electronic device using the homomorphic workspace.

11. The method of claim 10, wherein generating the homomorphic workspace includes:

compiling a results set satisfying the query; and loading the results set into the homomorphic workspace.

12. The method of claim 11, wherein the homomorphic encryption engine includes an application programming interface (API) to facilitate encrypted data analysis operations within the homomorphic workspace.

13. The method of claim 12, wherein the API is compatible with the results set.

14. The method of claim 10, wherein preprocessing the extracted data further includes performing feature extraction on the extracted data.

15. The method of claim 14, wherein preprocessing the extracted data further includes performing compression of the extracted data.

16. The method of claim 10, further comprising:

determining that the performance of the one or more data transactions is complete; and terminating, based on the determination, the secure homomorphic work session and the homomorphic workspace.

17. The method of claim 10, further comprising:

performing access control using the homomorphic encryption engine, including performing enforcement of role-based access control with respect to the electronic device to grant or deny access to the homomorphic workspace by the electronic device.

18. The method of claim 17, further comprising:

monitoring and auditing, using the homomorphic encryption engine, user access and data usage; and generating one or more reports based on the monitoring and auditing.

19. An electronic device comprising:

at least one processor; and memory, wherein the memory stores instructions that, when executed by the at least one processor, cause the electronic device to:

extract data from at least one internet-connected data source;

store the extracted data in a raw database;

preprocess the extracted data, including performance of an anonymization of the extracted data, cleansing of the extracted data, feature extraction on the extracted data, standardization of the extracted data, and compression of the extracted data;

store the preprocessed data in another database for storing the preprocessed data;

execute a homomorphic encryption engine to encrypt the preprocessed data and store the encrypted data in a storage location;

receive a query from another electronic device associated with the encrypted data;

generate, using the homomorphic encryption engine, a homomorphic workspace, including:

compile a results set satisfying the query; and load the results set into the homomorphic workspace;

initiate, using the homomorphic encryption engine, a secure homomorphic work session using the homomorphic workspace;

perform access control, using the homomorphic encryption engine, including performance of enforcement of role-based access control with respect to the other electronic device to grant or deny access to the homomorphic workspace by the other electronic device;

perform one or more data transactions with the other electronic device using the homomorphic workspace, wherein the homomorphic encryption engine includes an application programming interface (API) to facilitate encrypted data analysis operations within the homomorphic workspace, and wherein the API is configured to be compatible with the results set;

determine that the performance of the one or more data transactions is complete;

terminate, based on the determination, the secure homomorphic work session and the homomorphic workspace;

monitor and audit, using the homomorphic encryption engine, user access and data usage; and generate one or more reports based on the monitoring and auditing.

20. The electronic device of claim 19, wherein the instructions that, when executed by the at least one processor, further cause the electronic device to:

encode the extracted data stored in the raw database into plaintext data;

encrypt the plaintext data using a public key to create ciphertexts;

provide the encrypted plaintext data by a trusted environment for manipulation via the homomorphic workspace;

receive manipulated encrypted plaintext data over a secure channel of the secure homomorphic work session;

decrypt the manipulated encrypted plaintext data using a private key to obtain decrypted data; and decode the decrypted data and store the decoded decrypted data at a storage location.

* * * * *